United States Patent
Benson et al.

[15] 3,665,513
[45] May 23, 1972

[54] PASSIVE MAGNETIC TRANSFER OF DISCRETE MAGNETIC INFORMATION

[72] Inventors: Allen B. Benson, Rochester, Minn.; Elbert Troy Hatley, San Jose, Calif.

[73] Assignee: International Business Machines Corporation, Armonk, N.Y.

[22] Filed: Dec. 29, 1969

[21] Appl. No.: 888,639

[52] U.S. Cl. .................................346/74 M, 235/61.12 M
[51] Int. Cl. .................................G01d 15/12, G06k 19/08
[58] Field of Search.....................346/74 M, 74 MC, 74 MP; 179/100.2 E, 100.2 D; 235/61.12 M

[56] References Cited

UNITED STATES PATENTS

| | | | |
|---|---|---|---|
| 3,401,394 | 9/1968 | Leonard et al. | 346/74 M |
| 2,594,934 | 4/1952 | Kornei | 179/100.2 D |
| 2,747,027 | 5/1956 | Camras | 179/100.2 E |
| 2,686,229 | 8/1954 | Blaney | 179/100.2 E |
| 2,958,568 | 11/1960 | Hagelbarger | 346/74 MP |
| 2,704,634 | 3/1955 | Rauch | 235/61.11 |
| 3,384,899 | 5/1968 | Lagerqvist | 346/74 |

Primary Examiner—Bernard Konick
Assistant Examiner—Gary M. Hoffman
Attorney—Sughrue, Rothwell, Mion, Zinn & Macpeak

[57] ABSTRACT

A transaction record is prepared in both human and machine readable form by providing a card having both embossed data and magnetic data thereon and simultaneously imprinting the embossed data on a record card while transferring the magnetic data to a magnetizable portion of the record card. The magnetic data on the card is comprised of a plurality of discrete magnetic bits and is transferred to the magnetizable portion of the record card by subjecting the magnetic data and the magnetizable portion to a saturating prebiased D.C. field followed by a weaker D.C. transfer field.

8 Claims, 4 Drawing Figures

INVENTORS
ELBERT TROY HATLEY
ALLEN B. BENSON

BY Sughrue, Rothwell, Mion, Zinn & Macpeak

ATTORNEYS 3,665,513

PASSIVE MAGNETIC TRANSFER OF DISCRETE MAGNETIC INFORMATION

BACKGROUND OF THE INVENTION

1. Field of the Invention

The present invention is directed broadly to the passive transfer of magnetic information from a master record to a duplicate record and more particularly, the present invention is directed to credit card transactions wherein human readable embossed data and machine readable magnetic data are transferred simultaneously to a record card and/or a record journal.

2. Prior Art

In prior art credit transactions, a device known as the imprinter, records via an imprinting process, a customer's account number and/or name from the credit card as well as the amount of sale, location and the date from variable entry means. This prior art method of billing requires that the imprinted data be key punched or optically read using OCR machines. The latter scheme requires that the imprinting be of high quality, which, in turn, requires the imprinter to be in good adjustment and that the credit card is well embossed and not worn. In today's environment, the imprinted account number is not generally of such quality to be used in machine reading for sorting. This limitation is overcome by first reading the imprinting in a data capture run and then coding the same document with a machine readable code such as punched holes or a bar code. The documents are then sorted by reading the machine code. The capture run is expensive and there is always 5 to 40 percent of documents which cannot be read and must be manually processed and subsequently merged into the billing cycle. The high cost of data capture equipment plus the manual handling of rejects, causes this present day method to be very undesirable.

With respect to the actual transfer of the magnetic information, it is old and well known in the art to pre-bias a strip of magnetic material such as a magnetizable recording tape before bringing the tape into the super-imposed relation to the magnetic information on a card, such as a credit card. A permanent magnet head is then passed over the super-imposed card and tape and the information is transferred from the card to the tape by changing the magnetization of the pre-biased tape in those areas not shielded by the magnetic data on the card. However, none of the prior art devices utilize a passive permanent magnet arrangement having two gaps such that the discrete bits are magnetically saturated at the first gap and used as a magnetic source for transferring to the copy in the bias field of the second gap.

SUMMARY OF THE INVENTION

The present invention is comprised of a method of preparing a transaction record in both human readable and machinery readable form by utilizing a terminal for transferring magnetic data from a credit card having discrete magnetic bits thereon to a magnetic tape simultaneously with imprinting embossed information on the credit card to a record slip. The magnetic transfer process utilizes a two-gap bi-directional D.C. transfer magnet. As the transfer magnet is moved along the track of bits on the credit card held in contact with a magnetic stripe on a tape or card, the discrete bits are magnetically saturated at the first gap and used as a master source for transferring to the copy in the bias field of the second gap.

The present invention avoids the problem of destruction of the magnetic code on a credit card where the code is in the form of data bits and coded in a stripe by utilizing discrete bits of magnetic information.

The present invention provides a system whereby the magnetic data on a credit card can be passively transferred to a magnetic stripe on a record slip and simultaneously to a magnetic journal tape.

The present invention also provides a system whereby fixed information such as point of sale data and variable information such as cost and inventory number may simultaneously be recorded on the record slip and the magnetic journal tape along with the information from the credit card.

Other objects, features and advantages of the invention will be pointed out in the following detailed description and claims and illustrated in the accompanying drawings, which show by way of example and not limitation, the principle of the invention and preferred modes for applying that principle.

IN THE DRAWINGS

DETAILED DESCRIPTION OF THE INVENTION

The present disclosure presents a means of passive magnetic transfer of discretely encoded magnetic bit pattern information to magnetic stripes on documents or onto magnetic recording tape. Such a means are most commonly employed in commercial transactions of the type involving credit cards. When a credit card is utilized in a commercial transaction, the point of sale facility is provided with a terminal for transferring the information from the credit card to a record slip.

Figure 1:
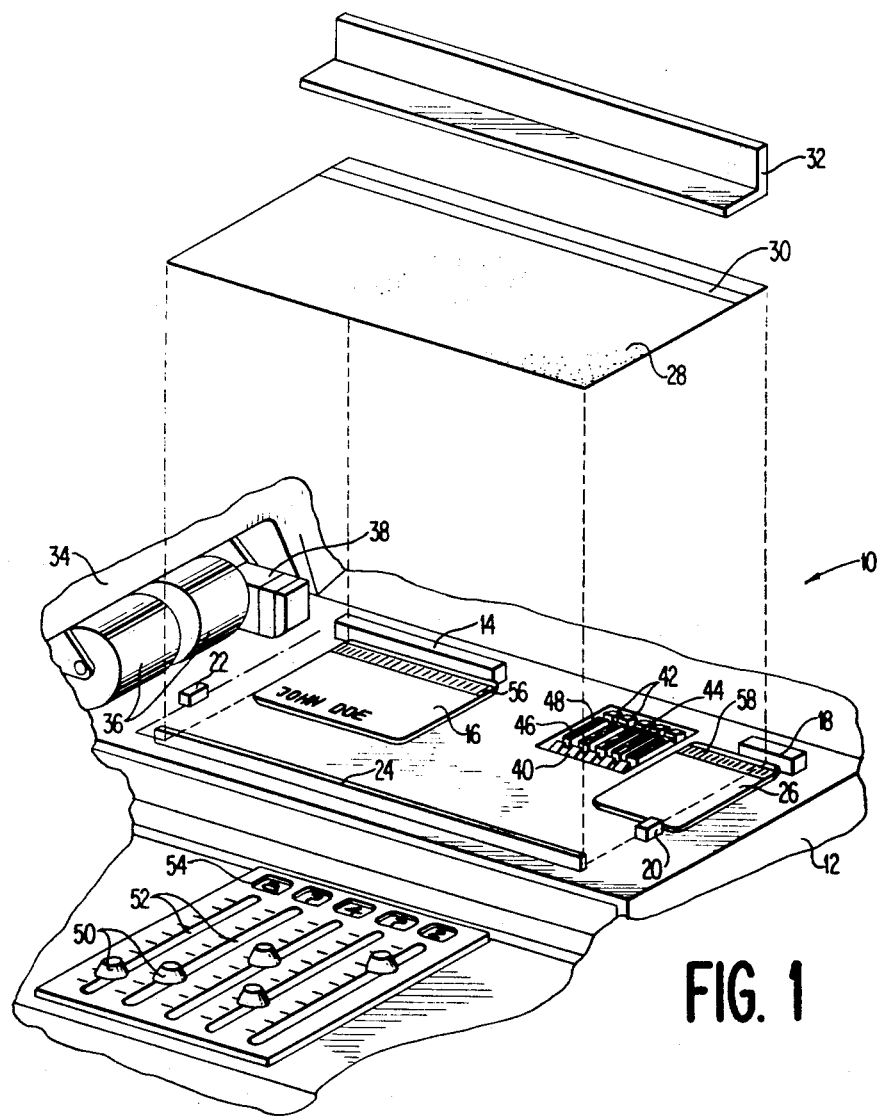
FIG. 1 is a partial exploded perspective view of a terminal according to the present invention.

Such a terminal is shown in FIG. 1 and is designated generally by the reference numeral 10. More specifically, the terminal is comprised of a base member 12 having a guide bar 14 secured to the surface thereof to facilitate locating the credit card 16 in the proper position. A similar bar 18 is also secured to the surface of the terminal for aiding and locating the point of sale information card 26. Since the information on this card 16 is generally constant for all transactions which take place at a particular location, the card 26 may be secured to the base 12 in a more permanent manner if desired.

Additional guide bars 20, 22 and 24 are also provided on the upper surface of the base 12 and cooperate with the guide bars 14 and 18 for aiding in the location of the record slip 28 which is provided with a magnetic stripe 30 adjacent one edge thereof. An additional guide rail 32 may be super-imposed on the record slip 28 when it is in the proper position between the guides on the surface of the base 12. This additional guide bar 32 may be separate from the base 12 or secured thereto in a hinged manner so that it may readily be pivoted to a position allowing the insertion of a record slip and credit card and pivoted to a clamping position to hold the record slip and credit card in secure alignment during the transfer of the magnetic information from the credit card to the record slip.

A movable carriage 34 is normally positioned at one end of the base 12 of the terminal as shown in FIG. 1. The carriage 34 is provided with a pair of resilient pressure rollers 36, journaled thereon for rotation and a magnetic transfer head 38 which will be described in detail hereinafter. The carriage is guided by suitable means (not shown) for manual reciprocation along the length of the base member 12 of the terminal during a transfer and return stroke.

The base member 12 of the terminal 10 is provided with a cutout 40 in which are positioned a plurality of information wheels 42, which are journaled on a common axis. Each of the wheels 42 are provided with a plurality of faces 44 which include embossed information 46 and magnetic bits of coded information, 48. The wheels may be rotated in a suitable well known manner, such as reciprocating slides (not shown) which are controlled by a plurality of knobs 50 guided in slots 52 on the face of the terminal base 12. Suitable indicia may be provided adjacent the slots and information windows 54 may be provided adjacent the end of each slot 52 whereby a visual representation of the information on the wheel may be visible. Thus, upon sliding the knobs 50, the respective wheel 42 may be rotated to set up the variable information for the transaction, such as the cost.

When the credit card 16, the variable information card 26 and the record slip 28 are all located on the terminal base 12 in the proper manner, the magnetic information 56 on the credit card, the magnetic information 48 on the rotatable wheels 42 and the magnetic information 58 on the variable information card 26, will all be disposed in alignment with, that is, in close proximity to, the magnetic stripe 30 on the record slip 28. By "close proximity" is meant that the magnetic elements 56, 48, and 58 are close enough to stripe 30 that magnetic fields set up by head 38 will saturate portions 56, 48, 58 and 30 and then amplify the bias field in stripe 30 in one pass, as will be more fully explained below. The remainder of the record slip 28 will be disposed over any embossed information on a credit card, the rotatable wheels 42 or the variable information card 26 and the record slip will be of suitable material such that upon pressing the record slip against the embossed information, the embossed information will be transferred and will become visible on the record slip 28. Thus, during a normal credit card transaction, the clerk will locate the variable information card 26 in the proper location on a terminal 12, push the knobs 50 to rotate the wheels to a position indicating the cost of the transaction, place the credit card 16 which was received from the customer in the proper location on a terminal base 12, place a fresh record slip 28 in super-imposed relation, lower the bar 32 and shift the carriage 34 from left to right as shown in FIG. 1. During this traversing movement of the carriage the pressure wheels 36 will bear against any embossed information to the record cards 16 and 26 or the wheels 42 to transfer the information to the record slip 28 by a printing operation. Simultaneously, the magnetic transfer head 38 will pass in close proximity to the magnetic information 56, 48, and 58 and the aligned stripe 30 on the record slip 28 to transfer the magnetic information to the magnetizable stripe 30 on the record slip 28.

Figure 2:
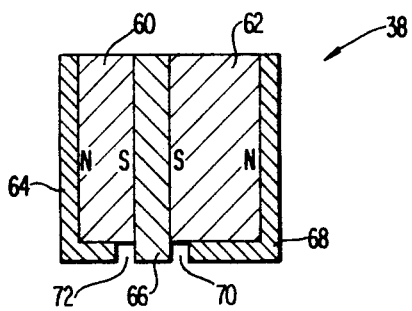
FIG. 2 is a detailed sectional view of the magnetic transfer head according to the present invention.

The magnetic transfer head 38 is shown in section in FIG. 2 and is made up of two ceramic magnets 60 and 62 that are assembled with high permeability pole pieces 64, 66, and 68. The magnetic structure is designed such that the field in the leading gap 70 is adequate to saturate both the discrete high coercivity bit on the credit card 16, the variable wheels 42, and the variable information card 26 as well as the magnetic stripe 30 of the record slip 28. The trailing gap 72, has a smaller field of opposite polarity for optimally biasing the magnetic stripe 30 for accepting the information from the discrete master bits.

The system is designed such that the pre-bias and the transfer magnet make only one in-contact pass over the transfer station. In the system shown in FIG. 1, this means that the transfer pass is made from left to right while the magnet is in transfer and emboss imprint position and is returned to the start position after the cards and record slip have been removed from the terminal. Alternatively, the carriage 34 may be designed such that the carriage may be pivoted to a position remote from the terminal bed 12 after the transfer stroke so that upon the return stroke of the carriage the magnetic head and printing rollers will be far removed from the cards and record slip. The leading magnetic gap 70 then is the one to the right of the bi-directional magnet structure shown in FIG. 2.

Figure 3:
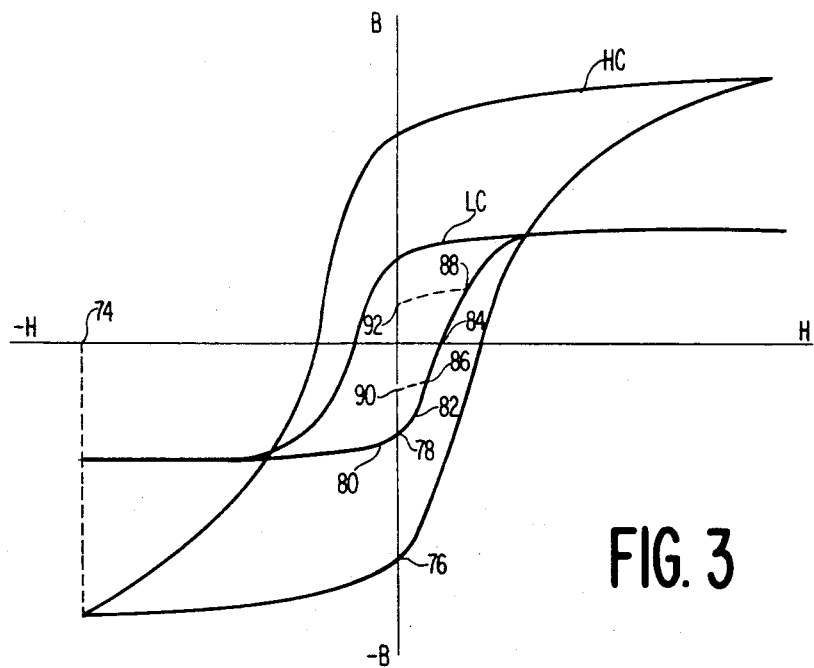
FIG. 3 is a graph showing the hysteresis or magnetization curves involved in the present invention.

The pre-bias and transfer operation can be explained from FIGS. 2 and 3. The magnetic information 56 on the credit card and the variable wheels is comprised of a discrete magnetic bit pattern stamped into the card and wheels from high coercivity magnetic material. The credit slip 28 has either a high or low coercivity stripe 30 placed thereon by lithographic means or by a transfer coat process. The hysteresis loops HC and LC of FIG. 3 show the characteristics of typical high coercivity materials and low coercivity materials respectively and will be used to explain the optimum bi-directional transfer field operation.

The lead gap 70 has a field that takes both stripe materials to position 74 as the gap passes by. The high and low coercivity materials are then left in the saturated state corresponding to point 76 and 78 respectively. Dealing more specifically now with the low coercivity copy material, it is noted that this material is affected by the master bit pattern fields such that points 80 and 82 are established at the copy stripe surface. As the reverse field gap 72 with a field value of 84 passes by the remnant bit positions, points 80 and 82 are taken to points 86 and 88. After the trailing gap passes, points 86 and 88 go to points 90 and 92 and remain to establish the read back signal from the record slip copy stripe.

Figure 4:
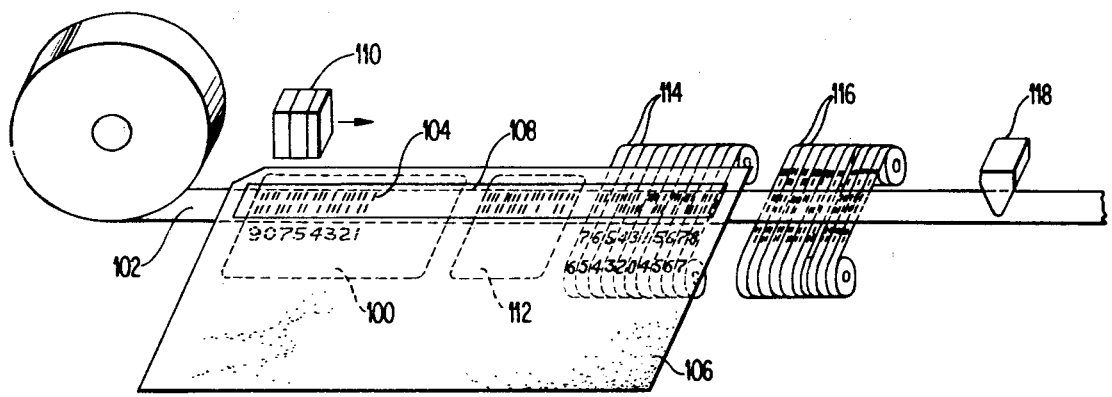
FIG. 4 is a schematic view of a modified terminal arrangement utilizing a magnetic journal tape in addition to a record slip.

A second system utilizing a phenomenon possible with the passive transfer method is shown in FIG. 4. The credit card 100 is placed in contact with a magnetic journal tape 102, with the oxide surface of the journal tape being placed next to the credit card bit pattern 104. The credit slip 106 is then placed on top of the journal tape 102 with the magnetic copy stripe 108 in contact with the mylar backing of the journal tape 102. A two-gap magnetic transfer head 110, similar to the head shown in FIG. 2 is used in the same manner as described above, with respect to FIG. 1 to effect simultaneous transfer of the magnetic information to the journal tape 102 and to the record slip copy stripe 108. It is also possible to utilize a plurality of journal tapes if desired, since the passive magnetic transfer arrangement according to the present invention is feasible with a combination of up to three journal tapes plus the credit slip for the simultaneous transfer of information from the magnetic credit card.

This arrangement of passive magnetic transfer is extremely suitable for retail transactions where both credit card imprinter and cash registers are used to record transactions. It is very desirable to capture all the necessary data for the above purpose in one single inexpensive operation. The necessary input data consists of the customer account number, point of sale number, merchandise article number, the amount of sale and the date. Therefore, in addition to the transfer of the information from the credit card to the journal tape and the record slip as shown in FIG. 4, the point of sale information such as a number is provided on a slip 112 which may be fixed to the imprinter. The variable numbers could be segments of wheels as described with respect to FIG. 1, or may be sliding bands 114 as shown in FIG. 4 which are controlled from the key board of the cash register. Thus, when the magnetic transfer head 110 is moved from left to right in FIG. 4 along with the imprinting rollers, (not shown) in the manner shown and described in FIG. 1 the credit card information, the point of sale information and the cost or amount of sale information will be visibly and magnetically transferred to the record slip 106 and the information will be transferred magnetically only to the journal tape 102. Additional sliding bands 116 may be provided for recording the item number only on the magnetic journal tape 102, for inventory purposes. The sliding bands 116 may also be controlled from a key board such as the cash register key board. Thus, all the information necessary for a modern business transaction is recorded on the journal tape 102 and the magnetic journal can be machine read on an off-line machine to provide all the point of sale information to a computing system covering a transaction. Or, as shown in FIG. 4, a read head 118 may be provided in the transaction device to read the magnetic journal immediately and send the transaction data to an on-line computer. The magnetic journal acts as a buffer so that the data can be written at slow speeds and read at lined rates.

While only a limited number of embodiments of the invention have been shown and described in detail, there will now be obvious to those skilled in the art, many modifications and variations which satisfy many or all of the objects of the invention, but which do not depart from the spirit of the invention as defined by the appended claims.

What is claimed is:

1. A method for preparing a transaction record in both human readable and machine readable form, comprising the steps of:

preparing an identification card having both an embossed data area and a magnetic data portion including a plurality of discrete code marks of high coercivity magnetizable material having a first coercivity, placing a record card in close proximity to said identification card, said record card having a high coercivity magnetizable portion having a second coercivity lower than said first coercivity in close proximity to said magnetic data portion, simultaneously imprinting said embossed data on said record card and transferring the magnetic code in said magnetic data portion to said magnetizable portion of said record card, the transferring step including subjecting said portions to a first D.C. magnetic field followed by a second D.C. magnetic field, said first field being of sufficient strength to prebias said portions to saturation and said second field being of lesser strength than said first field to amplify the resulting bias field in said magnetizable portion.

2. The method as set forth in claim 1 further comprising the steps of placing a magnetizable journal tape having a high coercivity magnetizable portion having a third coercivity lower than said first coercivity in close proximity to said identification card and said record card, and simultaneously transferring the magnetic data portion to said magnetizable journal tape and said record card.

3. The method as set forth in claim 2 further comprising providing variable information data in magnetic coded form and transferring said magnetic data to said magnetic journal tape in sequence with the simultaneous transfer of magnetic data from said identification card to said record and said journal tape.

4. A magnetic transfer device for transferring magnetic data from a source record having high coercivity discrete magnetic bits thereon to a copy record having a high coercivity magnetic stripe thereon comprising means for supporting said source record and said copy record with said magnetic data and said magnetic stripe in close proximity to each other, the coercivity of said bits being higher than the coercivity of said stripe, a magnetic head having two permanent magnet and pole piece piece means, defining a first gap adjacent one of the magnets and a second gap adjacent the other magnet, the first of said magnet and pole piece means for saturating said magnetic bits and said magnetic stripe, the second of said magnet and pole piece means for amplifying in said stripe the bias field induced therein by said magnetic bits, and means for movably supporting said magnetic head for moving said gaps in sequence in close proximity to said source record and copy record along said magnetic stripe, said first gap being arranged to lead said second gap during the transfer movement of said magnetic head.

5. A passive magnetic transfer device as set forth in claim 4 further comprising magnetic journal tape means, means for feeding said magnetic tape in juxtaposed relation to said magnetic data on said source record and said magnetic stripe on said copy record.

6. A data capture device for recording human and machine readable transaction data, comprising:

data card means for storing customer identification information in the form of embossed data and discrete bits of high coercivity magnetic material, journal tape means including a first surface of high coercivity magnetic material for receiving and storing a magnetic image of said bits, record card means including a second surface portion of high coercivity material and a data area for storing magnetic and imprinted images of said discrete bits and embossed data, respectively, the coercivity of said first and second surfaces being less than the coercivity of said bits, holding means for holding said data card means, settable means, journal tape means, and record card means with said discrete bits in close proximity to said first and second surfaces and said embossed data aligned with said data area, magnetic transfer head means including two magnet and gap means for establishing two D.C. magnetic force fields, the first field having a magnetic force sufficient to saturate said bits and surfaces for magnetically conditioning said surfaces and establishing a remanent force in said bits for biasing said surfaces, the second field having a non-saturating magnetic force for amplifying the bias field differences in said surfaces, settable means for recording variable transaction information in the form of embossed data and discrete bits of high coercivity magnetic material, imprinter means for imprinting an image of said embossed data on said data area of said record card means, means for simultaneously translating said magnetic transfer head means with said first field preceding said second field and said imprinter means to transfer said customer identification and variable transaction information from said data card means and said settable means to said record card means and journal tape means, magnetic transducer means for providing an output signal representative of the bit images in the surface of said journal tape, and means for decoding and transmitting said output signal to a remote computer.

7. A data capture device for recording human and machine readable transaction data, comprising:

data card means for storing customer identification information in the form of embossed data and discrete bits of high coercivity magnetic material, settable means for recording variable transaction information in the form of embossed data and discrete bits of high coercivity magnetic material, record card means including a surface portion of high coercivity material having a coercivity less than that of said discrete bits and a data area for storing magnetic and imprinted images of said discrete bits and embossed data, holding means for holding said data card means, settable means, and record card means with said discrete bits in close proximity to said surface, and said embossed data said data area, magnetic transfer head means including two magnetic and gap means for establishing two dc magnetic force fields, the first field having a magnetic force sufficient to saturate said bits and surface for magnetically conditioning said surface and establishing a remnant force in said bits for biasing said surface, the second field having a non-saturating magnetic force for amplifying the bias field differences in said surface, imprinter means for imprinting an image of said embossed data on said data area of said record card means, means for simultaneously translating said magnetic transfer head means with said first field preceding said second field and said imprinter means to record said customer identification and variable transaction information on said record card.

8. A data capture device for recording machine readable transaction data comprising:

data card means for storing customer identification in the form of discrete bits of high coercivity magnetic material, journal tape means including a surface of high coercivity magnetic material for receiving and storing a magnetic image of said bits, the coercivity of said surface being less than the coercivity of said bits, holding means for holding said data card means and said journal tape means with said discrete bits in close proximity to said surface, magnetic transfer head means including two magnetic and gap means for establishing two dc magnetic force fields, means for translating said magnetic transfer head means with said first field preceding said second field, the first field saturating said bits and surface for magnetically conditioning said surface and establishing a remnant force in said bits for biasing said surface, the second field having a non-saturating magnetic force for amplifying the bias field in said surface, magnetic transducer means for providing an output signal representative of the bit images in the surface of said journal tape, and means for decoding and transmitting said output signal to a remote computer.

* * * * *